US006626507B2

(12) United States Patent
Dean

(10) Patent No.: US 6,626,507 B2
(45) Date of Patent: Sep. 30, 2003

(54) FIRE SHIELD FOR AIR VENTILATION HOLES OF A COMPUTER CHASSIS

(75) Inventor: Ronald P Dean, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/902,075

(22) Filed: Jul. 9, 2001

(65) Prior Publication Data

US 2003/0006680 A1 Jan. 9, 2003

(51) Int. Cl.7 ................................................ A47B 81/00
(52) U.S. Cl. .................................................. 312/223.2
(58) Field of Search ........................... 312/223.1, 223.2;
248/300, 220.31, 220.41–220.43, 220.22,
222.51, 225.21, 226.12, 227.1, 227.2; 361/687,
690, 692, 693; 454/184

(56) References Cited

U.S. PATENT DOCUMENTS

| 4,280,173 | A | * | 7/1981 | Bradley et al. ............. 362/294 |
| 4,337,499 | A | * | 6/1982 | Cronin et al. ............... 361/687 |
| 4,365,288 | A | * | 12/1982 | Robe et al. ................. 361/690 |
| 4,403,708 | A | * | 9/1983 | Smolik .................... 248/222.2 |
| 4,557,095 | A | * | 12/1985 | Rice et al. .................... 52/473 |
| 4,576,302 | A | * | 3/1986 | Smolik .................... 248/222.2 |
| 4,717,216 | A | * | 1/1988 | Hornak ........................ 16/261 |
| 4,828,209 | A | * | 5/1989 | Niemi ..................... 248/221.2 |
| 5,132,872 | A | * | 7/1992 | Hase ........................... 361/692 |
| 5,201,879 | A | * | 4/1993 | Steele ......................... 454/184 |
| 5,463,529 | A | * | 10/1995 | Chia et al. ................... 165/185 |
| 5,784,256 | A | * | 7/1998 | Nakamura et al. ........... 257/712 |
| 5,955,955 | A | * | 9/1999 | Corcoran, Jr. et al. ...... 340/607 |
| 5,981,082 | A | * | 11/1999 | Pirchl ......................... 428/603 |
| 6,000,669 | A | * | 12/1999 | Seward et al. ............... 248/210 |
| 6,031,719 | A | * | 2/2000 | Schmitt et al. ............. 165/80.3 |
| 6,040,981 | A | * | 3/2000 | Schmitt et al. .............. 312/221 |
| 6,154,361 | A | * | 11/2000 | Anderson et al. ........... 248/636 |
| 6,209,836 | B1 | * | 4/2001 | Swanson ....................... 174/54 |
| 6,237,544 | B1 | * | 5/2001 | Croxford et al. ......... 122/14.22 |
| 6,246,580 | B1 | * | 6/2001 | Weng ......................... 174/16.1 |
| 6,276,044 | B1 | * | 8/2001 | Ragland et al. ................ 29/521 |
| 6,301,108 | B1 | * | 10/2001 | Stockbridge ................ 361/688 |
| 6,331,938 | B1 | * | 12/2001 | Hsieh et al. ................. 361/692 |
| 6,341,072 | B1 | * | 1/2002 | Liao ........................ 312/223.2 |
| 6,342,004 | B1 | * | 1/2002 | Lattimore et al. ........... 454/184 |
| 6,351,380 | B1 | * | 2/2002 | Curlee et al. .............. 165/80.3 |
| 6,364,141 | B1 | * | 4/2002 | Ehrgott ....................... 211/189 |
| 6,381,138 | B1 | * | 4/2002 | Chen ........................ 312/223.2 |
| 6,394,284 | B2 | * | 5/2002 | Bodensteiner et al. ........ 211/26 |
| 6,424,526 | B1 | * | 7/2002 | Heard ..................... 174/35 R |
| 6,426,459 | B1 | * | 7/2002 | Mitchell ................ 174/35 MS |

* cited by examiner

Primary Examiner—Bruce A. Lev
Assistant Examiner—Jennifer E. Novosad
(74) Attorney, Agent, or Firm—Kevin M. Hart

(57) ABSTRACT

A fire shield for mounting over air ventilation holes on the bottom of a computer chassis. The shield includes an offset for holding a fire-impenetrable surface away from the air ventilation holes. The surface blocks a path that passes through the ventilation holes and extends orthogonally outward from the computer chassis, thus preventing flaming particles that fall through the air holes from passing beyond the shield. The shield establishes an air cavity that is in fluid communication with the air holes and with ambient air for cooling purposes. It may be constructed of sheet metal with first and second folded portions serving to create the offset. Hooks along the first elongate fold engage the air holes. A clearance hole on the second elongate fold receives a fastener. The air cavity may vent to ambient air on either end of the shield between the two folds.

11 Claims, 3 Drawing Sheets

FIRE SHIELD FOR AIR VENTILATION HOLES OF A COMPUTER CHASSIS

FIELD OF THE INVENTION

This invention relates to computer enclosures.

BACKGROUND

Most computers require that air ventilation holes be placed at various locations around the chassis for cooling purposes. Indeed, to provide maximum cooling efficiency and to facilitate numerous mounting options for the chassis, it is desirable to provide ventilation holes on as many surfaces of the chassis as possible. Unfortunately, other considerations also apply that make the location of ventilation holes difficult. For example, computers in the United States must meet requirements of the United Laboratories concerning fire safety. Specifically, reasonable steps must be taken to ensure that flaming particles within a computer may not freely fall through openings in the bottom of a computer. For this reason, it was previously thought that ventilation holes could not be placed on the bottom of a computer, because to do so would potentially allow flaming particles to exit the computer from the bottom.

SUMMARY OF THE INVENTION

In one aspect, the invention includes a fire shield that may be mounted over air ventilation holes on the bottom of a computer chassis. The fire shield may include at least one offset for holding a fire-impenetrable surface away from the air ventilation holes of the computer chassis. The surface blocks a path that passes through the ventilation holes and extends orthogonally outward from the computer chassis, thus preventing flaming particles that exit the air holes from passing beyond the shield. The shield also establishes an air cavity that is in fluid communication with the air holes in the computer chassis and with ambient air for cooling purposes.

In another aspect, the fire shield may be constructed of sheet metal. First and second elongate folds in the sheet metal may be used to create the offset and establish the air cavity. Hooks may be provided along the first elongate fold to engage the air holes. A clearance hole may be provided on the second elongate fold to receive a fastener such as a screw. Once the hooks are engaged with the air holes and the screw is attached, the shield will be retained against the chassis even when the shield is on the bottom side. The air cavity may vent to ambient air on either end of the shield between the two elongate folds.

DETAILED DESCRIPTION OF THE PREFERRED EMBODIMENTS

Figure 1:
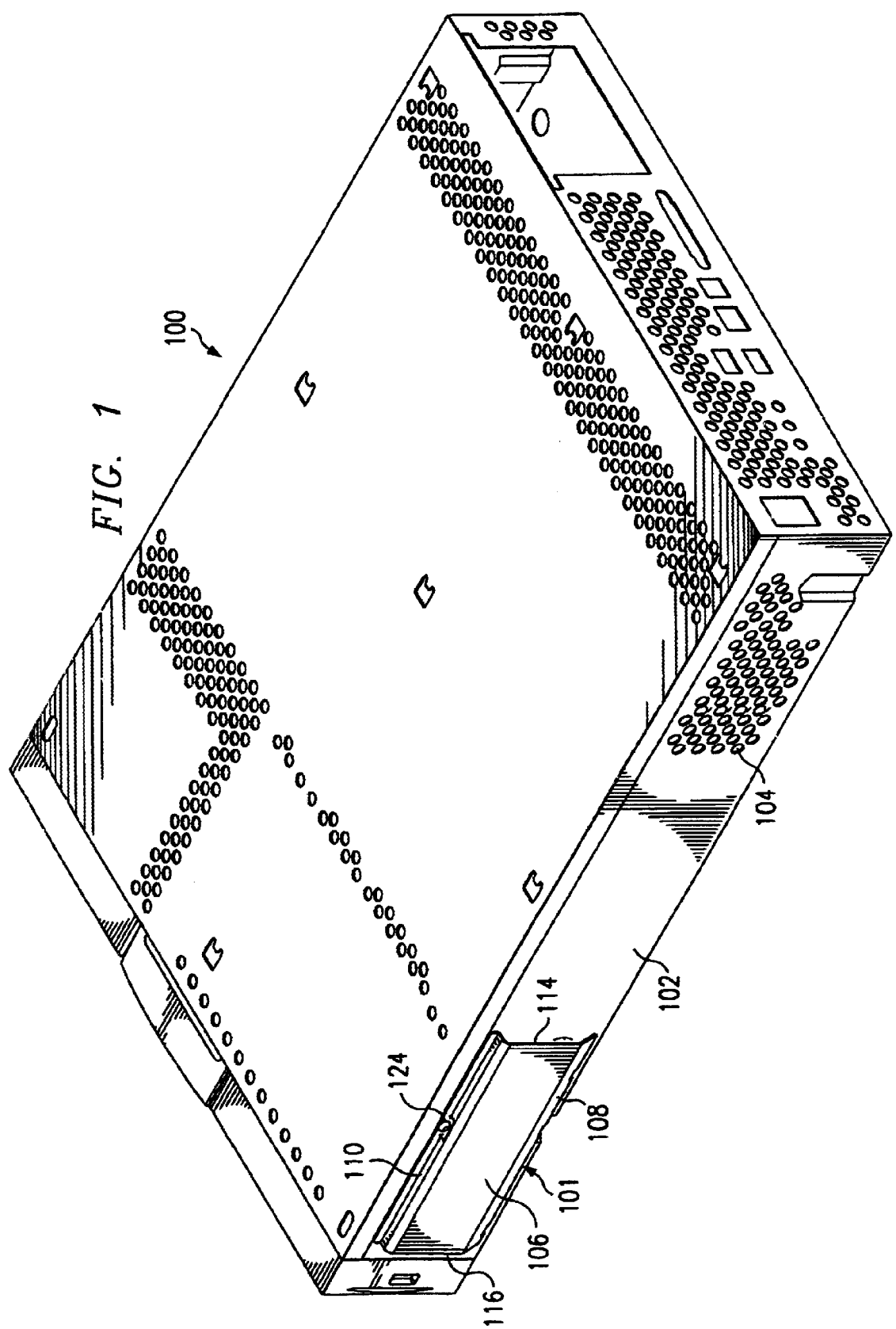
FIG. 1 is an oblique view illustrating a fire shield attached over air ventilation holes of a computer chassis according to a preferred embodiment of the invention.
Figure 2:
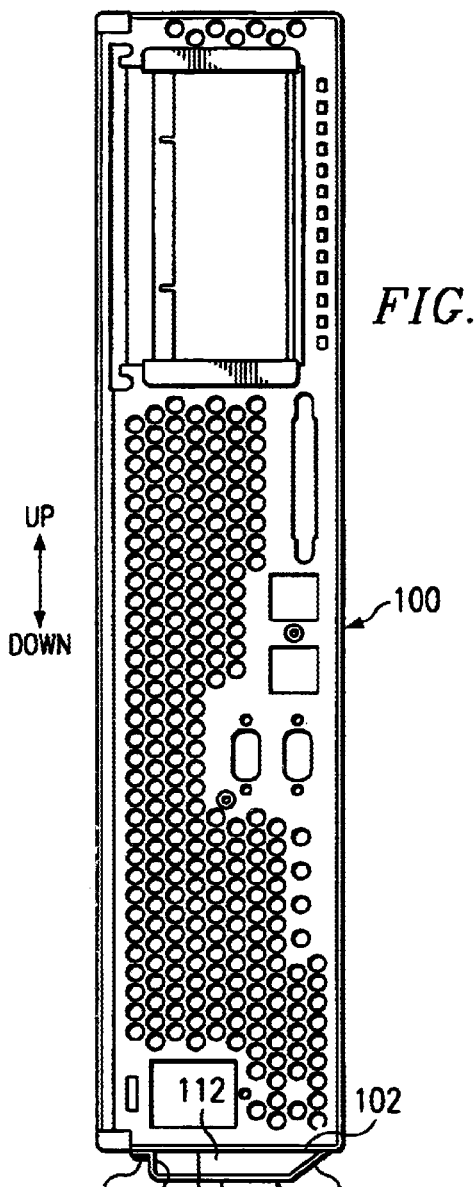
FIG. 2 is a side orthogonal view of the fire shield and computer chassis of FIG. 1.
Figure 4:
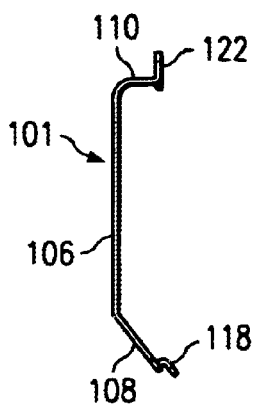
FIGS. 3 and 4 are top and side orthogonal views of the fire shield of FIGS. 1 and 2.
Figure 3:
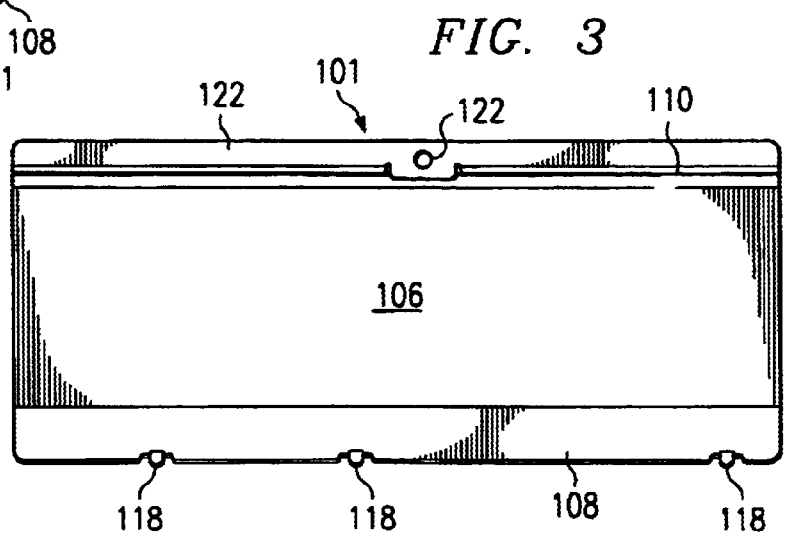
Figure 5:
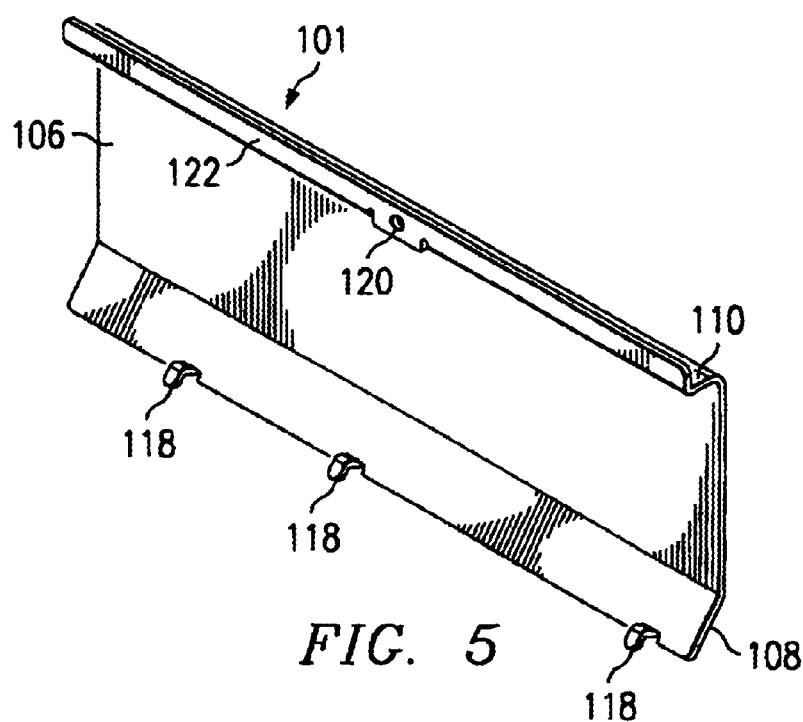
FIGS. 5 and 6 are front and back oblique views of the fire shield of FIGS. 1–4.
Figure 6:
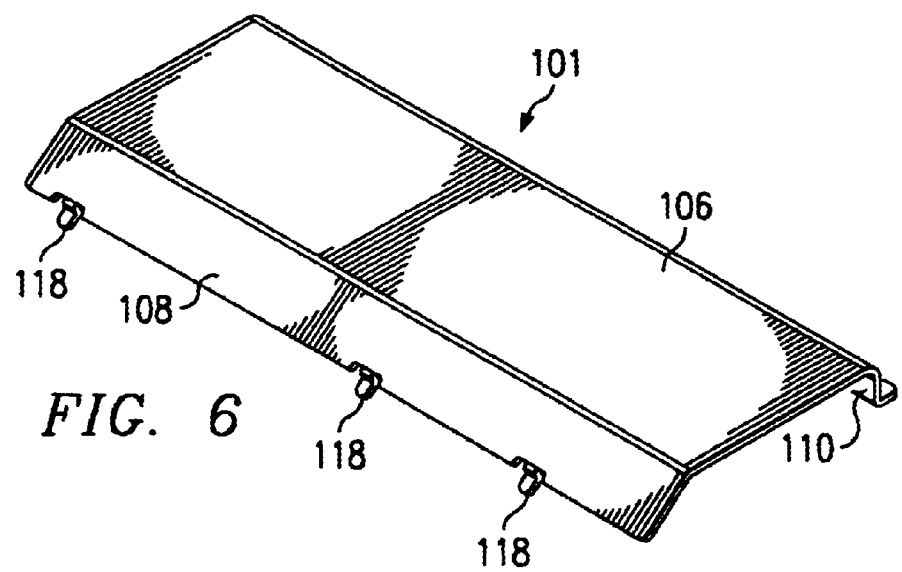

FIGS. 1 and 2 illustrate, by way of example, a computer 100 having a fire shield 101 attached thereto according to a preferred embodiment of the invention. Computer 100 includes a chassis 102 having at least one air ventilation hole 104 therein. Fire shield 101 may include a substantially fire-impenetrable surface 106 and may be attached to chassis 102 over one or more air ventilation holes 104. (In FIG. 1, fire shield 101 is shown installed over a plurality of air ventilation holes that cannot be seen because the shield visually obscures them. The air ventilation holes under fire shield 101 may be similar to those shown on the other side of the chassis at 104. Prior to using the embodiment shown, a separate fire shield 101 should be placed over the air ventilation holes 104 that are visible in FIG. 1.)

Surface 106 should have sufficient area to block a path that passes through air ventilation hole(s) 104 and extends orthogonally outward from chassis 102, as shown in FIG. 2 at 107. This enables surface 106 to catch any flaming particles that may escape chassis 102 when computer 100 is oriented so that air ventilation hole(s) 104 are on the bottom.

Fire shield 101 includes an offset for separating surface 106 from chassis 102 a sufficient distance to establish an air cavity 112 between chassis 102 and the inside of surface 106. Air cavity 112 should be in fluid communication with ambient air for ventilation and cooling of computer 100. In the embodiment shown, air cavity 112 is in fluid communication with ambient air on both ends 114, 116 between folded portions 108, 110.

Fire shield 101 may be constructed using a single piece of sheet metal. In the embodiment shown, the sheet metal is folded to establish two elongate folded portions 108, 110 that serve to create the offset. To facilitate attachment of fire shield 101 to chassis 102, hooks 118 may be provided along the edge of folded portion 108 opposite surface 106, and a clearance hole 120 may be provided on folded portion 110 opposite surface 106 to receive a fastener such as screw 124. (In the embodiment shown, hole 120 is formed in a flange 122.) Hooks 118 may be engaged with the edges of air ventilation hole(s) 104, and then fire shield 101 may be pivoted into position so that clearance hole 120 is aligned with a corresponding hole in chassis 102. Once screw 124 (or another suitable fastener) is attached through hole 120, fire shield 101 will be retained against chassis 102 when computer 100 is oriented so that hole(s) 104 are on the bottom, as shown in FIG. 2. Hooks 118 may be placed in numerous positions, as shown, to accommodate different arrangements of air ventilation holes and chassis contours.

What is claimed is:

1. A computer, comprising:
   a computer chassis having an air ventilation hole in a bottom side thereof; and
   a fire shield disposed over the air ventilation hole, wherein the fire shield comprises:
      a substantially fire-impenetrable surface having sufficient area to block a path that passes through the air ventilation hole of the computer chassis and extends orthogonally outward from the computer chassis;
      an offset for separating the surface from the computer chassis a sufficient distance to establish an air cavity between the surface and the computer chassis; and
      wherein the air cavity is in fluid communication with ambient air.

2. The computer of claim 1, wherein:
   the surface and the offset are integrally formed from sheet metal.

3. The computer of claim 2, wherein:
   the offset comprises first and second folded portions of the sheet metal.

4. The computer of claim 3, wherein:

the folded portions of the sheet metal are disposed along first and second opposite elongate sides of the surface.

5. A computer, comprising:

a computer chassis having an air ventilation hole in a bottom side thereof; and a fire shield disposed over the air ventilation hole, wherein the fire shield comprises:

a sheet metal surface having sufficient area to block a path that passes through the air ventilation hole of the computer chassis and extends orthogonally outward from the computer chassis;

an offset comprising first and second folded portions of the sheet metal for separating the surface from the computer chassis a sufficient distance to establish an air cavity between the surface and the computer chassis;

wherein the folded portions of the sheet metal are disposed along first and second opposite elongate sides of the surface; and wherein the air cavity is in fluid communication with ambient air on at least one end of the surface between the folded portions.

6. The computer of claim 5, wherein:

the cavity is in fluid communication with ambient air on both ends of the surface between the folded portions.

7. The computer of claim 5, further comprising:

at least one hook on the first folded portion opposite the surface for engaging an edge of the air ventilation hole.

8. The computer of claim 5, further comprising:

at least one clearance hole on the second folded portion opposite the surface for receiving a fastener.

9. The computer of claim 6, further comprising:

at least one clearance hole on the second folded portion opposite the surface for receiving a fastener.

10. The computer of claim 9, wherein:

the fastener is a screw for engaging the computer chassis.

11. A method of configuring a computer for operation, comprising:

attaching a fire shield over an air ventilation hole of a chassis of the computer such that an air cavity is established between the fire shield and the air ventilation hole, wherein the air cavity is in fluid communication with ambient air while the fire shield blocks a path that passes through the air ventilation hole and extends orthogonally outward from the chassis; and orienting the chassis so that the air ventilation hole is disposed on a bottom side thereof.

\* \* \* \* \*